United States Patent [19]

Yost

[11] Patent Number: 5,374,438

[45] Date of Patent: * Dec. 20, 1994

[54] QUICK-SETTING SANDWICH BISCUIT CREAM FILLINGS

[75] Inventor: Ruth A. Yost, Mountain Lakes, N.J.

[73] Assignee: Nabisco, Inc., Parsippany, N.J.

[*] Notice: The portion of the term of this patent subsequent to Nov. 2, 2010 has been disclaimed.

[21] Appl. No.: 964,314

[22] Filed: Oct. 21, 1992

[51] Int. Cl.$^5$ .................................................. A23P 1/16
[52] U.S. Cl. ..................................... 426/497; 426/607; 426/804
[58] Field of Search ............... 426/275, 143, 553, 556, 426/558, 589, 653, 497, 804, 607

[56] References Cited

U.S. PATENT DOCUMENTS

| | | | |
|---|---|---|---|
| 3,024,112 | 3/1962 | Burgess | 426/497 |
| 3,508,926 | 4/1970 | Werbin | 426/496 |
| 4,746,526 | 5/1988 | Carroll | 426/496 |
| 4,812,323 | 3/1989 | Savage | 426/496 |
| 4,865,862 | 9/1989 | McFeaters | 426/496 |

OTHER PUBLICATIONS

Shishikura 1986 Agri. Biol. Chem 50(5) 1209–1215.
Desrosier 1977 Elements of Food Technology pp. 435–439 and 531–537 AVI Publishing Co., Westport Conn.
Patton 1976 Biomedical Aspects of Lactation pp. 78–83 Pergamon Press Oxford, England.

*Primary Examiner*—Carolyn Paden

[57] ABSTRACT

Quick-setting cream fillings especially suitable for sandwich biscuits contain fats bearing short $C_2$ to $C_4$ acid residues and long, saturated $C_{16}$ to $C_{22}$ fatty acid residues. One preferred embodiment contains fats bearing butyric acid residues and residues of fatty acids derived from fully hydrogenated oils containing at least about 75% stearic acid such as hydrogenated soybean oil or hydrogenated canola. Another preferred embodiment contains fats bearing the same complement of saturated long residues, but the short residues are derived from acetic, propionic and butyric acids. These fats are low in calories and low in lauric, myristic, and palmitic saturated, and trans unsaturated acid residues. Biscuit sandwiches prepared with these fillings adhere well to the biscuits so that sandwich cookie and crackers containing the fillings are not as misaligned, smeared, or subject to splitting or decapping in production or after storage as conventional products.

22 Claims, No Drawings

QUICK-SETTING SANDWICH BISCUIT CREAM FILLINGS

TECHNICAL FIELD

This invention relates to quick-setting sandwich biscuit cream fillings that resist misalignment, smearing and decapping.

Sandwich cookies and crackers occupy a significant place in the world biscuit market. Typically, two identical biscuits (the shells or basecakes) contain a layer of sweet or savory fat cream filling. There are many variations on this basic type. For example, the shells may be dissimilar in shape or color and one shell may have a hole or holes through which the cream can be seen. The sandwich may be formed with wafer sheets and have multiple layers of cream between the wafers. Creamed biscuits may be enrobed with a chocolate or other coating.

The fat component of sandwich cookie and cracker cream fillings affects not only the eating character of the product, but other important aspects of process and quality. The sandwich cream filling should be firm at ambient temperature to maintain product shape and not squeeze out on handling or when bitten, yet have organoleptic properties allowing rapid melting in the mouth to release ingredients giving maximum flavor sensation without greasiness. The sandwich cream filling should adhere to the biscuits so that the basecakes do not become misaligned or smeared, and the product does not fall apart (known as splitting or decapping) in production or after storage.

It would be desirable to have sandwich biscuit cream fillings that accomplish these goals without the use of bonding agents or specialized manufacturing equipment.

BACKGROUND ART

A number of fats, other ingredients, and processing conditions have been suggested for use in preparing filled biscuit sandwiches. Hydrogenated coconut and palm kernel oils are most used for cream fillings (Manley, D. J. R., *Technology of Biscuits, Crackers and Cookies*, Ellis Horwood, Ltd., Chichester, 1983, pages 72 to 74). However, these lauric fats exhibit cooling difficulties and have a tendency to supercool. On leaving the plasticizer, the fat is often too fluid to have been well plasticized. As the supercooling is relieved, the mass sets up making extraction from a bulk store difficult unless the general temperature is considerably higher than 20° C. If creams are made from fat that is warm, it is not possible to achieve the same amount of aeration with open type mixers, and the resulting cream is rather soft for most creaming machines (ibid.).

Controlled creamed biscuit cooling and good pressure following topping of the sandwich have been suggested to alleviate the problem (id. at 343 to 344). Either the cream should be warmer at depositing or the biscuit shell should be warmer than the cream. Where cooling is done, this should be minimal to effect a desired firmness of the cream on the hottest day. Cooling air temperatures should be adjusted so that the biscuits are not taken to below the dew point so that condensation does not spoil biscuit shell quality, or adhesion at the biscuit-cream interface. Because of the high cost of operations and plant space for cooling tunnels, many plants do not cool their sandwich cookies and crackers either long enough or low enough (Smith, W. H., *Biscuits, Crackers and Cookies*, vol. 1, MFI, New York, 1972, pages 332 to 333).

U.S. Pat. No. 4,587,128 to Cummings suggested that a bonding layer be employed to make a snack food product, and that a pressure bearing member in the production equipment press the components into intimate contact with the bonding layer, but this complicates manufacture by adding another component and a pressure bearing member.

Even where desirable processing conditions have been achieved, food products containing hydrogenated lauric fats have fallen into disfavor for other reasons. These fats are high in calories, and tend to have significant levels of lauric, myristic and palmitic acids in their saturated acid complement, and significant levels of trans-unsaturation in their unsaturated acid complement. These saturated acids have been shown to increase plasma cholesterol concentrations (Bonanome, A., and Grundy, S. M., *New Eng. Jour. Med.* 318: 1244–1248 (1988)), and trans unsaturated fatty acids have been recently shown to raise low density lipoprotein serum cholesterol levels and to lower high density lipoprotein serum cholesterol levels in adults fed fats having these acids (Mensink, R. P., and Katan, M. B., *New Eng. Jour. Med.*, 323:439–445 (1990)). Moreover, in Western countries, there is a general trend away from high calorie foods for weight control, and decreasing dietary fats has been of special interest since fats have a significantly higher caloric density than either carbohydrates or protein. Hence, a goal of recent research in the food industry has been to minimize or eliminate lauric fats and partially hydrogenated fats in food products, and to decrease caloric intake from fats.

It would be desirable to have low calorie filling fats that contain little or no lauric or trans unsaturated fats. It would also be desirable to have quick-setting, adherent cream fillings that can be used in sandwich biscuit products to minimize misalignment and decapping.

DISCLOSURE OF THE INVENTION

An object of the present invention is to provide a new group of cream filler fats that contain little or no lauric fats.

It is another object to provide filler fats that are low in calories, low in lauric, myristic and palmitic acid, and low in or free of trans unsaturation.

It is a further and principal object of the present invention to provide sandwich cookie and cracker products formulated with cream fillings especially selected to minimize misaligned, smeared, split or decapped products, both in production and after storage.

These and other objects are accomplished by the present invention, which provides quick-setting cream filling compositions comprising triglycerides bearing $C_2$ to $C_4$ short acid residues and long $C_{16}$ to $C_{22}$ saturated fatty acid residues and a flavoring. Biscuit sandwiches comprise two biscuits layered on opposite sides of the cream filling. In preferred embodiments, the filling fats contain triglycerides bearing long, saturated fatty acid residues derived from hydrogenated oils having at least about 75% stearic acid residues and short acid residues derived from acids selected from the group consisting of propionic acid, butyric acid, mixtures of acetic acid and propionic acid, mixtures of acetic acid and butyric acid, mixtures of propionic acid and butyric acid, and mixtures of acetic acid, propionic acid, and butyric acid. Two particularly preferred embodiments contain fats bearing the same complement of long residues, such as, for example, long residues derived from hydrogenated canola or hydrogenated soybean oil, and short residues derived either from butyric acid, or a mixture of acetic, propionic, and butyric acids.

Sandwich cookies and crackers improved with the fillings of this invention are disclosed. These products are lower in calories and lower in lauric, myristic, and palmitic acid and trans unsaturation than typical sandwich biscuits prepared with conventional fats such as lauric fats, lard, or butter. Since the fillings are quick-setting and adhere well to the biscuits, the products are not as misaligned, smeared or subject to splitting or decapping in production or after storage as conventional biscuits.

Methods for minimizing misalignment and decapping in the production of biscuit sandwiches are also disclosed.

GENERAL DESCRIPTION OF THE INVENTION

The sandwich biscuit cream fillings of this invention have a fat component enriched with triglycerides having both long, saturated $C_{16}$ to $C_{22}$ fatty acid residues and short $C_2$ to $C_4$ acid residues (hereafter referred to as "short/long triglycerides"). Most preferably, the long fatty acid residues will be predominantly, i.e., at least about 75%, and in some embodiments at least about 90%, $C_{18}$, and the short acid residues will be either predominantly $C_4$ or a mixture of $C_2$ to $C_4$.

Denoting the aliphatic portion of the long fatty acid substituent as L and the short as S, the sandwich biscuit cream fillings of this invention contain fats comprising a mixture of SSL, SLS, LLS, and LSL species described by the following formulae:

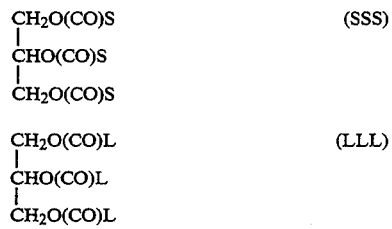

where each L, independently, is a long chain saturated aliphatic group having-between 15 and 21 carbons, derived from a fatty acid having 16 and 22 carbons; and and each S, independently, is a short chain group having 1 to 3 carbons, derived from an acid having 2 to 4 carbons.

Depending upon the preparative procedure, the triglyceride mixtures may also contain triglycerides of the formulae

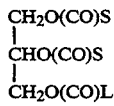   (SSS)

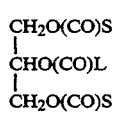   (LLL)

where S and L are as defined above.

However, preferred mixtures contain essentially no SSS and less than 2% LLL.

Short acid residues have 2 to 4 carbons. Short residues are derived from carboxylic acids of the formula SCOOH, where S is a short chain aliphatic group having 1 to 3 carbons. As denoted herein, where triglycerides are described as bearing pendant groups derived from acids having 2, 3, or 4 carbons, compositions derived from acids having predominantly 2, 3, or 4 carbons are included. Acylation of a glycerol hydroxyl by acid SCOOH results in the attachment of short chain S to the glycerol backbone by means of an ester linkage (—O—(CO)—). Where there is more than one short group attached to a glyceride, the groups may be the same or different. As used herein, the term "acid residue" refers to an acyl group comprising a short chain portion, here S, and a carbonyl group.

Short chain S may be straight or branched. Short chain S may be derived from any synthetic or natural organic acid including, but not limited to acetic (ethanoic), propionic (propanoic), butyric (butanoic), and the like acids. As used herein, chemical names include isomeric variations; for example, "butyric acid" includes normal-butyric acid (butanoic) and iso-butyric (2-methylpropanoic) acid, and so forth. Preferred acids are acetic, propionic, and butyric acids, and mixtures of these.

The long saturated pendant groups are derived from fatty acids of the formula LCOOH, where L is a saturated aliphatic group having 15 to 21 carbons. L groups may be derived from any synthetic or natural, straight or branched saturated organic acid including, but not limited to, palmitic (hexadecanoic), stearic (octadecanoic), arachidic (eicosanoic), behenic (docosanoic), and the like acids.

Unsaturated long groups may also be present in the mixtures. These are derived from unsaturated acids of the formula UCOOH, where U is a $C_{15}$ to $C_{19}$ unsaturated group, including, but not limited to, palmitoleic (9-hexadecenoic), oleic (cis-9-octadecenoic), elaidic (trans-9-octadecenoic), vaccenic (trans-11-octadecenoic), linoleic (cis, cis-9,12-octadecedienoic), linolenic (9,12,15-octadecatrinoic and 6,9,12-octadecatrienoic), eleostearic (9,11,13-octadecatrienoic), arachidonic (5,8,11,14-eicosatetraenoic), and the like acids. L groups may be derived from hydrogenated U groups.

The various L and U groups can be derived from mixtures of fatty acids obtained from natural oils such as soybean, safflower, sunflower, sesame, peanut, corn, olive, rice bran, mustard seed, cottonseed, poppyseed, rapeseed, marine, meadowfoam and the like oils; fats such as babassu nut oil, palm oil, palm kernel oil, tallow, lard, shea butter, dairy butter; or plant waxes such as jojoba. Fat mixtures and/or fractions, crystallized fats, interesterified fats and mixtures of these may also be employed.

Mixtures of L groups are preferably derived from oils and fats that are hydrogenated, most preferably fully hydrogenated. Hydrogenated fats having at least about 70%, preferably at least about 75%, stearic acid residues such as, for example, hydrogenated peanut oil, hydrogenated olive oil, hydrogenated soybean oil, hydrogenated sesame oil, and hydrogenated corn oil are especially desirable for some embodiments. Other embodiments employ L moieties derived from hydrogenated fats having at least about 90% stearic acid residues, such as hydrogenated sunflower oil, hydrogenated safflower oil and hydrogenated canola. Preferred hydrogenated feedstocks are low in palmitic acid.

Component triglycerides making up the filling fats of this invention may be prepared using synthetic procedures known to those skilled in the art, such as, for example, directly esterifying glycerol or glycerol esters with fatty acids, fatty acid halides (notably chlorides) or fatty acid anhydrides, transesterifying glycerol with fatty acid esters, or interesterifying long and short chain triglycerides for such time and under such conditions that triglycerides bearing long and short residues form. Starting materials for triglyceride preparations may be obtained commercially or isolated from natural sources. Alternatively, component triglycerides may be isolated from natural or processed fats or oils, or fractions thereof.

Some desirable triglyceride mixtures are prepared using a random interesterification of triacetin, tripropionin and/or tributyrin with a substantially hydrogenated fat having at least about 70%, in some cases at least about 75%, and, in some embodiments, at least about 90%, stearic acid residues. For example, filler fats of this invention can be derived by the random interesterification of tributyrin with hydrogenated canola or hydrogenated soybean oil or the random interesterification of triacetin and tripropionin with hydrogenated canola or hydrogenated soybean oil. Mixtures and fractions of triglycerides may also be employed, such as mixtures of products derived by interesterifying tributyrin with hydrogenated canola and tributyrin with hydrogenated soybean oil. Example preparations are illustrated hereafter.

Isolated or prepared triglycerides are purified using techniques known to those skilled in the art. These include, but are not limited to, steam deodorization, fractional crystallization, distillation, chromatography, and the like. Example purifications are illustrated hereafter.

BEST MODES FOR CARRYING OUT THE INVENTION

In the practice of this invention, short/long triglycerides, fats bearing short $C_2$ to $C_4$ acid residues and long, saturated $C_{16}$ to $C_{22}$ fatty acid residues as defined above, are incorporated in full or partial replacement of the fat component in cream fillings for sandwich biscuits and the like. Biscuit sandwiches comprise two biscuits layered on opposite sides of the cream filling.

As used herein, a "cream filling" includes any filling having a fat component, whether or not the filling has the actual consistency of a cream. The fillings of this invention typically have a fat component making up about 25 weight percent to about 35 weight percent of the total filling composition. The fillings may additionally have an aqueous component of water, milk, fruit juice or other liquid. Thus, low density fillings containing up to about 20% water such as candy foams, medium density fillings containing about 5 to about 15% of an aqueous phase such as cupcake fillings, and high density fillings such as sandwich cookie fillings containing little or no aqueous phase are encompassed by this invention.

The short/long triglycerides may be incorporated either alone, or in combination with another fat and/or fat mimetic, into any cream filling. Other fats include butter, cocoa butter, natural triglycerides rich in highly desirable or essential fatty acids, such as oleic, linoleic, linolenic, or eicosapentaenoic acid, triglycerides bearing fatty acids having beneficial attributes such as those associated with conjugated linoleic acid isomers, medium chain triglycerides and the like. Other fat mimetics include any heretofore suggested as edible fat replacements, including, but not limited to, sugar esters, neoalkyl esters, polyglycerol esters, malonate esters, propoxylated glycerols, retrofats, carboxy/carboxylates, polyvinyl alcohol esters and the like.

When employed either alone or in products with other fats, short/long triglycerides are desirably added to the filling compositions in amounts effective to provide a significant caloric reduction of the calories due to fat. For example, a 25% or greater replacement would be effective for this purpose, and replacements of at least 25%, more particularly 50 to 100%, are desired in many cases. Except for chocolate fillings, preferred embodiments employ short/long triglycerides in full replacement of the filler fat component. Preferred chocolate and chocolate-like fillings employ cocoa powder or other chocolate flavoring rather than cocoa butter.

The cream fillings of this invention contain a flavoring and, in most embodiments, at least one other component in addition to the flavoring and the fat components. For example, sandwich cracker fillers typically contain salt. Sandwich cookie fillers typically contain a sweetener; indeed, in sweet creams, the major ingredients are sweetener and fat. The sweetener can be a natural sweetener such as sugar, primarily sucrose, glucose, fructose, and maltose, or any one of known artificial sweeteners including 1-aspartyl-1-phenylalanine methyl ester (commercially available as aspartame or Nutri-Sweet ™), saccharine, cyclamate and the potassium salt of 6-methyl-3,4-dihydro-1,2,3-oxathiazin-4-one-2,2-dioxide (commercially available as acesulfame-K), or a mixture of these.

The filling compositions of the present invention can also contain other ingredients depending upon the flavor or other properties desired. For instance, milk or milk powders or solids (preferably nonfat) can be included, as can eggs, gelatin, cornstarch or other starch such as potato or rice, fruits and nuts, vegetable, cheese and meat pieces, colorings, and lecithin or other emulsifiers. Compositions containing artificial sweeteners substantially sweeter than sucrose typically contain a bulking agent such as polydextrose, isomalt, isomaltulose, polyglucose, polymaltose, carboxymethyl-cellulose, microcrystalline cellulose, cellulose gel, arabinogalactan, as well as mixtures or combinations of any of these. These agents can be included in amounts readily determinable by the skilled artisan.

Broadly speaking, the cream fillings of this invention can be employed in a variety of food products, including bakery, dessert, snack, candy, dairy, nut, meat, egg, and vegetable products. The fillings are especially adapted to all types of bakery products including leavened baked products, both yeast raised and chemically leavened, and unleavened baked products. Bakery products include cakes, breads, rolls, pastries, cookies, biscuits, and savory crackers. Especially preferred embodiments employ the fillings of the invention in sandwich cookies and sandwich crackers.

For sandwich biscuits, the fillings are formulated using the short/long triglycerides in the fat component, mixed, and, optionally aerated, before applying to the shell or basecake by stencilling, depositing, extruding, or other means known to the skilled artisan. The basecake and filler combination is then capped with another basecake. A typical formulation for a high density sandwich cookie filling, for example, employs about 60 to about 65% by weight sugar and about 35 to about 37% by weight fat, with the remainder comprising flavoring. Specific examples are illustrated hereafter.

The fillings and filled products of this invention exhibit a number of desirable characteristics. The fillings set up fast, which allows greater quality control and minimizes product rejects from production problems such as misalignment, smearing, decapping or splitting, off center placement of filling and flowing over the basecake edge, and sloshing of the filling over the basecake edge.

The fillings of this invention also exhibit good adherence, holding the top and bottom basecakes together well. In fact, the cementing effect of preferred embodiments is so pronounced that, in control tests with sandwich cookies, the basecakes were harder to twist apart than control cookies. Because of these particularly desirable quick-set, good adhesion features, misalignment and decapping in the production of biscuit sandwiches can be minimized by using the fillings of this invention without resorting to extra bonding layers or special pressure and/or cooling equipment.

Another advantage of the invention is that employment of short/long triglycerides provides a wide range of densities and textures in the fillings. Since many fillings are dense and quick-setting, less cooling is required, simplifying production, and products can be stored on the shelf and/or at higher temperatures than controls.

Another advantage of the invention is that desirable organoleptic characteristics can be achieved. In preferred embodiments, fillings made with short/long triglycerides melt away faster in the mouth than control fillings made with vegetable shortenings. The effect is especially pronounced in sandwich cookie fillings made with confectioner's sugar.

Another advantage of the invention is that lauric fats, lard, butter and other fats undesirable because they contain significant quantities of lauric, myristic, and/or palmitic acid can be minimized or, preferably, eliminated entirely from cream fillers by using the fats of this invention. Preferred embodiments yield products low in trans unsaturation as well.

EXAMPLES

The following examples are presented to further illustrate and explain the present invention and should not be taken as limiting in any regard. Unless otherwise indicated, all parts and percentages are by weight, and are based on the weight at the particular stage of the processing being described. Solid fat indices (herein abbreviated S.F.I.) are determined using dilatometry according to A.O.C.S. Method Cd 10-57 (1989) and solid fat contents (S.F.C.) of the products are determined using nuclear magnetic resonance (NMR) using A.O.C.S. method 16-81, both methods reporting solids at 50° F. (10° C.), 70° F. (21.1° C.), 80° F. (26.7° C.), 92° F. (33.3° C.), and 100° F. (37.8° C.). Mettler dropping points (M.D.P.) are determined using a Mettler Thermosystem FP 800 following A.O.C.S. Method Cc 18-80 (1989).

NMR data reported are proton NMR data. NMR S/L ratios are determined as the ratio of intensities of the methyl ($—CH_3$) resonances for the short and long fatty acid groups, respectively, obtained by dividing the integral areas attributable to S components by the areas attributable to the L, and have experimental errors of 5 to 10%. In a typical NMR spectrum at 300 MegaHertz or higher, the long acid methyl resonance occurs farthest upfield, at $\sim 0.9$ ppm, as a triplet. The short acid methyl resonance is structure dependent and occurs at $\sim 2.00$ ppm (acetyl groups), $\sim 1.15$ ppm (propionyl groups) and $\sim 0.95$ ppm (butyryl groups).

Fat product analysis using supercritical fluid chromatography (S.C.C.), separating and quantifying the mixture components, generally employ a standard procedure. After filtering through a 0.45 micron filter, 0.1 $\mu$l of a 30 to 50 mg/ml sample is injected onto a 1×100 mm Deltabond Cyano ™ column from Keystone Scientific in a Suprex Model 200 A S.C.C. having an S.C.C.-grade carbon dioxide mobile phase and an oven temperature of 125° C. A linear pressure gradient of 100 to 300 atmospheres is applied over a course of 20 minutes (i.e., 10 atm/min), followed by a hold at 300 atmospheres for 10 minutes. A flame ionization detector at 400° C. detects emerging mixture components run against an internal standard of methyl tetradecanoate (10 to 12 mg/mL) in methylene chloride. External standards of mono-, di-, and tristearin ($\sim 10$ mg/mL each) are run under identical conditions. Using these peak areas, the peak areas of the sample are normalized, added together, and divided by the total to obtain percentages of LSS & SLS, LLS & LSL, and LLL in the short/long mixtures.

EXAMPLE 1

In this example, reduced calorie fat mixtures for use in sandwich biscuit cream fillings of this invention are prepared by interesterifying hydrogenated canola (refined, low erucic rapeseed oil containing 4% palmitic acid, hydrogenated at 180° C. and 60 lbs hydrogen until the Iodine Value (IV) is $\leq 3$) with tributyrin (obtained commercially from Eastman Kodak). Each mixture is subjected to proton nuclear magnetic resonance (NMR) spectroscopy; integration of the intensities of the various groups gives an estimate of the molar ratio of short (in this case, butyric) to long acids (S/L) present.

One molar equivalent hydrogenated canola (899 g) and 2 to 4.5 molar equivalents tributyrin are interesterified in the presence of 0.2 to 0.3% sodium methoxide by heating to $\sim 110°$ C. with agitation under a vacuum for about half an hour until color develops. (The M.D.P. may be checked at this time, and the reaction continued if the M.D.P. has not dropped sufficiently.) Phosphoric acid ($\sim 0.2$ to $\sim 0.5\%$, at least twice the amount of sodium methoxide) is added to stop each reaction and neutralize the mixture, followed by the addition of 0.5% activated bleaching clay (Tonsil Optimum FF), 0.5% diatomaceous earth, and 1000 ppm citric acid (dissolved in water) to decolorize and remove soaps. The treatment is continued for $\frac{1}{2}$ to 1 hour at 110° C. The products are cooled to 80° C., filtered, bleached, and steam deodorized at 210° C. for 2 to 3 hours.

Using this procedure, a 1:25 molar reactant ratio of hydrogenated canola to tributyrin yields a liquid product having a M.D.P. of 18.6° C. and an NMR S/L of 2.0. A 1:12 reactant ratio yields another liquid product having a M.D.P. of 22.1° C. and a S.F.I. of 54.3% at 50° F., 3.8% at 70° F. and 0% at 80° F. Conversely, a 1:0.5 molar ratio yields a waxy product having a M.D.P. of 63.0° C. and an NMR S/L of 0.5; S.C.C. analysis shows 17.0% LSS/SLS, 38.5% LLS/LSL, and 44.5% LLL. Similarly, a 1:1 molar ratio of hydrogenated canola to tributyrin yields a product having a M.D.P. of 57.9° C. and an NMR S/L of 0.8; S.C.C. analysis shows 39.2% Lss/SLS, 43.8% LLS/LSL, and 17.1% LLL. Using intermediate reactant ratios, the following triglyceride mixtures are obtained:

| Hydrogenated Canola:Tributyrin Reactant Molar Ratio | | | | | | |
| --- | --- | --- | --- | --- | --- | --- |
|  | 1:2 | 1:2.5 | 1:3 | 1:3.5 | 1:4 | 1:4.5 |
| M.D.P., °C. | 35.1 | 31.8 | 30.4 | 28.7 | 27.5 | 26.6 |
| S.F.I. 50° F. | 68.8 | 69.5 | 66.8 | 63.6 | 63.8 | 63.4 |
| 70° F. | 52.3 | 53.6 | 39.6 | 33.1 | 29.8 | 24.7 |
| 80° F. | 24.0 | 23.7 | 8.8 | 4.7 | 3.9 | 2.1 |
| 92° F. | 10.0 | 9.2 | 4.3 | 3.2 | 2.3 | 1.6 |
| 100° F. | 9.2 | 8.8 | 4.0 | 2.6 | 0.0 | 0.0 |
| NMR S/L | 1.2 | 1.2 | 1.3 | 1.4 | 1.5 | 1.4 |
| SCC, % LSS/SLS | 57.2 | 67.2 | 69.4 | 73.2 | 78.1 | 80.2 |
| % LLS/LSL | 34.7 | 28.8 | 27.1 | 24.0 | 20.5 | 18.4 |
| % LLL | 8.1 | 4.0 | 3.4 | 2.7 | 1.4 | 1.4 |

EXAMPLE 2

Other sandwich cream filler fats of this invention are prepared in this example. Two and a half moles of tributyrin are randomly interesterified with, respectively, 1 mole hydrogenated canola (denoted "A" below) and 1 mole hydrogenated soybean oil (denoted "B" below) and purified as described in Example 1 above, to yield steam deodorized products having the following properties:

|  | A (canola) | B (soybean) |
| --- | --- | --- |
| M.D.P. | 30.9° C. | 33.2° C. |
| S.F.I. 50° F. | 64.8% | 66.8% |
| 70° F. | 38.7% | 36.9% |
| 80° F. | 11.4% | 12.1% |
| 92° F. | 4.9% | 7.7% |
| 100° F. | 5.2% | 6.9% |

Using S.C.C., product A is found to contain 66.7% SSL/SLS, 29.6% SLL/LSL, and 3.7% LLL.

The products are distilled in a further purification step using a Pope TM 2" wipe film still configured for molecular distillation. For distilling product A, the still body temperature is 215° C., the inner condenser temperature is 50° C., the wiper speed is 60 rpm, reverse mode, the vacuum is 0.04 mm Hg, the feed rate is 200 drops per minute, the distillation rate is 134 drops per minute, and the residue rate is 76 drops per minute. Using S.C.C., distilled product A is found to contain 63.5% SSL/SLS, 32.3% LLS/LSL, and 4.2% LLL.

Product B is distilled using the same equipment. The still body temperature is 260° C., the inner condenser temperature is 73° C., the vacuum is 0.05 to 0.03 mm Hg, and the wiper speed is 161 rpm, reverse mode. Chromatographic analysis of the distillate fraction show that the product contains no LLL species, whereas the residue does.

EXAMPLE 3

This example illustrates the preparation of a high density sandwich cookie filling using the fats described in Example 2 above. The filling is prepared by mixing

| ingredient | grams |
| --- | --- |
| Confectioner's Sugar (6X) | 188 |
| Steam Deodorized Canola Fat Product A | 77.5 |
| Distilled Soybean Fat Product B | 22.5 |
| Vanillin Crystals | 0.15 | together and processing in the usual manner. The resulting filler had an acceptable texture and a buttery note not present in a control prepared with an all-purpose soybean oil shortening obtained commercially (refined, bleached, partially hydrogenated, deodorized soybean oil to which no antioxidant is added; 1 to 4% hardened soybean oil may be added to adjust solids).

EXAMPLE 4

Other sandwich cream filler fats of this invention are prepared in this example. One mole of hydrogenated canola is randomly interesterified with one mole of triacetin and eleven moles of tripropionin (C), and eleven moles of triacetin and one mole of tripropionin (D), respectively, and purified using steam deodorization described in Example 1 above. Determinations of M.D.P and S.F.C. are made as described above, and the complement of SSL/SLS, LLS/LSL, and LLL species determined using S.C.C., yielding the following data:

|  | C | D |
| --- | --- | --- |
| M.D.P. | 17.6° C. | 35.0° C. |
| S.F.C. 50° F. | 68.1% | 82.1% |
| 70° F. | 43.0% | 78.4% |
| 80° F. | 5.1% | 71.7% |
| 92° F. | 3.8% | 29.9% |
| 100° F. | 4.7% | 4.9% |
| S.C.C. SSL/SLS | 82.3% | 87.1% |
| LLS/LSL | 15.7% | 12.2 |
| LLL | 2.0% | 0.6% |

These are distilled using the equipment described in Example 2 (188°–210° C. still body temperature, 50° C. inner condenser temperature, 0.07 to 0.03 mM Hg vacuum, 80 rpm reverse wiper speed) to yield more highly purified fractions. The S.F.C. of distilled product C shows 70.4% solids at 50° F., 28.6% at 70° F., and 0% at 80° F. The NMR S/L ratio is 2. The NMR fatty acid profile shows 5% acetic, 62% propionic, and 33% long chain acids.

EXAMPLE 5

A low density candy foam filling is prepared in this example using a fat prepared in Example 4 above. The filling is prepared by mixing

| ingredient | grams |
| --- | --- |
| Confectioner's Sugar (6X) | 217.50 |
| Nonfat Dry Milk | 35.00 |
| Steam Deodorized Product D | 138.75 |
| Vanillin Crystals | 1.25 |
| Water (at room temperature) | 86.75 | together, with the water added in two stages, and processing in the usual manner.

EXAMPLE 6

This example illustrates the preparation of various high density sandwich cookie fillings using the fats described in Examples 2 and 4 above, comparisons of these with a control filling made with an all-purpose soybean oil shortening.

One filling employs a mixture of a 50/50 blend of Fat Product A of Example 2 and distilled Fat Product C of Example 4, which has approximately the same S.F.C. values as the control. The filling is prepared by mixing 188 g confectioner's sugar (6X), 50 g Fat Product A, 50 g distilled Fat Product C, and 0.15 g vanillin crystals. The filling has a slightly greater viscosity during mixing at elevated temperatures of 23° to 45° C., and is slightly shinier and sets up faster than the control. After cooling to room temperature, the final filling is 66% softer than the control (as measured by 0.5" diameter, stainless steel ball probe on TA-XT2 Texture Analyzer TM at 2 mm/sec), shiny and smooth. The filling melted faster in the mouth than the control.

Another sandwich cookie filling is prepared by mixing 100 g Fat Product B of Example 2 with 188 g confectioner's sugar (6X) and 0.15 g vanillin crystals. The final cooled filling is 35% softer than the control (measured under the same TA-XT2 conditions as set out in the above paragraph), shiny and smooth. The filling melted faster in the mouth and does not feel quite as gritty as the control.

A filling prepared using Fat Product A of Example 2, which has greater S.F.C. values at any given temperature than the control filler fat, does not as closely resemble the control. The full formula filling has significantly greater viscosity during mixing and appeared dry and crumbly, not smooth and creamy. The final cooled filling is 20% harder than the control (measured under the same TA-XT2 conditions), dull and grainy looking and clumpy. This cooled filling is hard enough that it chips when spread with a knife, yet it melts slightly faster in the mouth than the control.

Another sandwich cream filling may be prepared by mixing 37 parts of Fat Product A of Example 2 with 62.7 parts sugar (10X), and 0.3 parts vanillin.

EXAMPLE 7

This example illustrates the preparation of decapping-resistant sandwich cookies which employ cream fillings of this invention.

Cream fillings are prepared using the following formula:

| ingredient | % | g |
| --- | --- | --- |
| Fat Product D of Example 4 | 50.0 | 2000 |
| Sugar, 10X | 48.2048 | 1928.2 |
| Whey Powder | 1.6250 | 65.0 |
| Dough Salt | 0.0687 | 2.76 |
| Vanilla | 0.1015 | 4.06 |

The fat is melted and combined with the other ingredients. All are then mixed well, aerated, and cooled before sandwiching with basecakes.

Sandwich cookie basecakes which can be used to make sandwich cookies using this filling are prepared by combining

| ingredient | parts |
| --- | --- |
| Flour | 48.0 |
| High Fructose Corn Syrup | 12.0 |
| Sugar (6X) | 10.0 |
| Corn Oil | 10.0 |
| Dutched Cocoa | 5.0 |
| Corn Syrup (42 D.E.) | 3.0 |
| Dextrose | 2.0 |
| Frozen Whole Eggs | 2.0 |
| Salt | 0.3 |
| Sodium Bicarbonate | 0.2 |
| Lecithin | 0.2 |
| Vanilla | 0.2 |
| Ammonium Bicarbonate | 0.1 |
| Water | 7.0 | mixing well, rotary molding, baking and cooling. The filling is sandwiched between basecakes in a ratio of 1 to 3.

Sandwich cookies made using fillings prepared with 100 fat product B or 77.7% A and 22.5% B are notably harder to separate than cookies made with a control fillings.

EXAMPLE 8

This example illustrates the preparation of cupcake cream fillings.

Fat ingredients are first prepared. One mole hydrogenated soybean oil is randomly interesterified with 1.5 moles triacetin and 1.5 moles tripropionin and steam deodorized as set out in Example 1 to yield a product denoted "E" below) having a M.D.P. of 36.0° C. and an S.F.I. of 71.9% at 50° F., 71.0% at 70° F., 64.7% at 80° F., 7.0% at 92° F., and 3.2% at 100° F. One mole of high oleic sunflower oil is randomly interesterified with 11 moles triacetin and 1 mole of tripropionin and purified as set out in Example 1 to yield a liquid product (denoted "F" below).

One cupcake filling is prepared by mixing

| ingredient | grams |
| --- | --- |
| Confectioner's Sugar (6X) | 160 |
| Fat Product E | 50 |
| Fat Product F | 50 |
| Water | ~40 |
| Nonfat Dry Milk | 35 |
| Vanillin Crystals | −1 | and processing in the usual manner. Other flavors may be substituted for the vanillin.

Provided that the total amount of fat be 100 grams, other fillings may be prepared by substituting 80 to 100 grams fat product B of Example 2 and 0 to 20 grams distilled fat product B of Example 2 for Fat Products E and F in the above list of ingredients.

EXAMPLE 9

This example illustrates the preparation of quick-setting cracker fillings.

A peanut butter is prepared by mixing

| ingredient | grams |
| --- | --- |
| Medium Roast Peanut Flour (32% fat) | 90.00 |
| Polydextrose | 45.00 |
| Distilled Example 2 Fat Product B | 39.00 |
| Peanut Flour (15% fat) | 30.00 |
| Nonfat Dry Milk | 30.00 |
| Fat Product B of Example 2 | 27.00 |

-continued

| ingredient | grams |
|---|---|
| Fine Granulated Sugar | 15.00 |
| Durasorb TM D Stabilizer | 5.57 |
| Salt | 2.25 | and processing in the usual manner. Using this peanut butter, a peanut butter filling is prepared by combining

| ingredient | parts |
|---|---|
| Peanut Butter (above recipe) | 100 |
| Peanut Flour (28% fat) | 30 |
| Cracker Meal | 19 |
| Maltodextrin (DE = 5 to 10) | 15 | and processing in the usual manner.

A cheese filling is prepared by combining

| ingredient | parts |
|---|---|
| Cheese Blend (whey, cheese, spices) | 135 |
| Fat Product C of Example 4 | 60 |
| Distilled Fat Product B of Example 2 | 40 |
| Cracker Meal | 34 | and processing in the usual manner.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

I claim:

1. A biscuit sandwich comprising two biscuits layered on opposite sides of a quick-setting, adherent filling comprising
   (a) a fat component, wherein at least about 25% of the fat component comprises low-calorie triglycerides bearing both $C_2$ to $C_4$ short acid residues and long $C_{16}$ to $C_{22}$ saturated fatty acid residues of the formulae

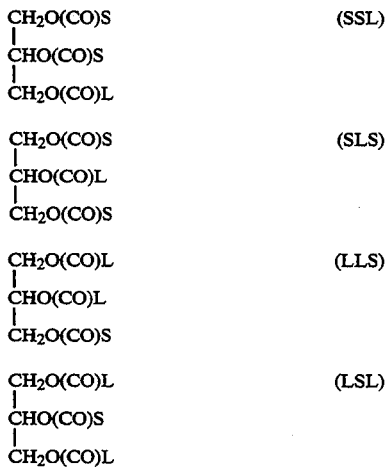

where each L, independently, is a long chain saturated aliphatic group having between 15 and 21 carbons, derived from a fatty acid having 16 and 22 carbons; and and each S, independently, is a short chain group having 1 to 3 carbons, derived from an acid having 2 to 4 carbons; and
   (b) a flavoring.

2. A biscuit sandwich according to claim 1 wherein the short acid residues in the triglycerides are derived from acetic acid, propionic acid, butyric acid, or mixtures of these, and the long fatty acid residues are derived from hydrogenated oils having at least about 75% stearic acid residues.

3. A biscuit sandwich according to claim 2 wherein the short acid residues are derived from a mixture of acetic acid, propionic acid, and butyric acid.

4. A biscuit sandwich according to claim 2 wherein the short acid residues are derived from butyric acid.

5. A biscuit sandwich according to claim 2 wherein the long fatty acids are derived from hydrogenated oils having at least about 90% stearic acid residues.

6. A biscuit sandwich according to claim 2 wherein the long acid residues are derived from hydrogenated oils selected from the group consisting of hydrogenated soybean oil and hydrogenated canola.

7. A biscuit sandwich according to claim 2 comprising triglycerides derived by the random interesterification of reactants selected from the group consisting of:
   (a) tributyrin and hydrogenated canola or hydrogenated soybean oil;
   (b) triacetin, tripropionin, and hydrogenated canola or hydrogenated soybean oil; and
   (c) mixtures of these.

8. A biscuit sandwich according to claim 7 comprising a mixture of
   (i) triglycerides derived by the random interesterification of tributyrin and hydrogenated canola, and
   (ii) triglycerides derived by the random interesterification of tributyrin and hydrogenated soybean oil.

9. A biscuit sandwich according to claim 8 wherein the interesterification of (i) comprises 2.5 moles tributyrin and 1 mole canola and the interesterification of (ii) comprises 2.5 moles tributyrin and 1 mole hydrogenated soybean oil.

10. A biscuit sandwich cookie according to claim 1 further comprising a sweetener.

11. A sandwich cracker according to claim 1 further comprising salt.

12. A sandwich cookie comprising basecakes and a quick-setting cream filler composition comprising
   (a) a fat component, wherein at least about 25% of the fat component comprises triglycerides bearing both long, saturated fatty acid residues derived from fatty acids having between 16 and 22 carbons, and short acid residues derived from acids selected from the group consisting of butyric acid and mixtures of acetic acid, propionic acid, and butyric acid;
   (b) a sweetener; and
   (c) a flavoring.

13. A cookie according to claim 12 wherein at least about 75% of the long acid residues in the filler composition are derived from stearic acid.

14. A cookie according to claim 12 wherein the short acid residues in the filler composition comprise butyric acid residues.

15. A method for minimizing misalignment and decapping in the production of sandwich biscuits having a filling containing a fat component comprising replacing at least 25% of the fat component with triglycerides bearing both long, saturated fatty acid residues derived from $C_{16}$ to $C_{22}$ fatty acids, and short acid residues derived from the group consisting of acetic acid, propionic acid, butyric acid, and mixtures of these.

16. A method according to claim 15 wherein the long acids are derived from hydrogenated oils having at least about 75% stearic acid residues, and the short acids are derived from a mixture of acetic acid, propionic acid, and butyric acid.

17. A method according to claim 15 wherein the long acids are derived from hydrogenated oils having at least about 75% stearic acid residues, and the short acids are derived from butyric acid.

18. A method according to claim 15 wherein the triglycerides are added to replace the fat component in the filling in amounts effective to reduce calories.

19. A method according to claim 15 wherein the fat component in the filling consists essentially of the triglycerides bearing long and short residues.

20. In a process for preparing sandwich biscuits comprising applying to a basecake a cream filler composition having a fat component, and capping said basecake and filler combination with another basecake, an improvement wherein the fat component in said cream filler composition comprises at least 25% triglycerides bearing both long, saturated fatty acid residues derived from $C_{16}$ to $C_{22}$ fatty acids, and short acid residues derived from the group consisting of acetic acid, propionic acid, butyric acid, and mixtures of these to improve adhesion of the basecakes.

21. An improvement according to claim 20 wherein said triglycerides in said cream filler composition are employed in amounts sufficient to minimize misalignment and decapping.

22. An improvement according to claim 20 wherein said triglycerides bear long residues derived from hydrogenated oils having at least about 75% stearic acid residues, and the short residues selected from the group consisting of butyric acid, mixtures of acetic and propionic acid, and mixtures of these.

* * * * *